United States Patent [19]
Stegall et al.

[11] Patent Number: 5,867,910
[45] Date of Patent: Feb. 9, 1999

[54] CONTROL FOR PORTABLE POWER TOOL

[75] Inventors: Robert Stegall, Lake Villa; Lawrence N. Will, Spring Grove; William Kalnins, Maple Park, all of Ill.

[73] Assignee: Kioritz Corporation, Tokyo, Japan

[21] Appl. No.: 779,573

[22] Filed: Jan. 7, 1997

[51] Int. Cl.⁶ .............................. B26B 7/00; B26B 19/38
[52] U.S. Cl. ........................... 30/272.1; 30/216; 30/276; 30/517; 173/170
[58] Field of Search ................................... 30/208, 272.1, 30/276, 216, 286, 389, 381, 382, 369, 388, 501, 502, 517, 312, 340, 347, 228, 210; 173/170; 16/125

[56] References Cited

U.S. PATENT DOCUMENTS

| 4,898,039 | 2/1990 | Aiyama | 30/216 |
| 5,653,030 | 8/1997 | Yokoyama et al. | 30/216 |
| 5,697,258 | 12/1997 | Aiyama | 30/216 X |

FOREIGN PATENT DOCUMENTS

| 2558567 | 7/1985 | France | 30/216 |
| 2839002 | 3/1980 | Germany | 30/216 |

*Primary Examiner*—Rinaldi I. Rada
*Assistant Examiner*—Boyer Ashley
*Attorney, Agent, or Firm*—Armstrong, Westerman, Hattori, McLeland and Naughton

[57] ABSTRACT

A portable tool including a frame, a working element on the frame and a power unit for operating the working element. A switch on the frame switches between a first state, e.g., stop operation, and a second state, e.g., running operation. An actuator on the frame is repositionable relative to the frame to selectively change the switch from its first state into its second state and in a first path to change the switch from its first state into its second state. The actuator is mounted for movement relative to the frame in a second path that is different than the first path to change the switch from its first state into its second state.

3 Claims, 3 Drawing Sheets

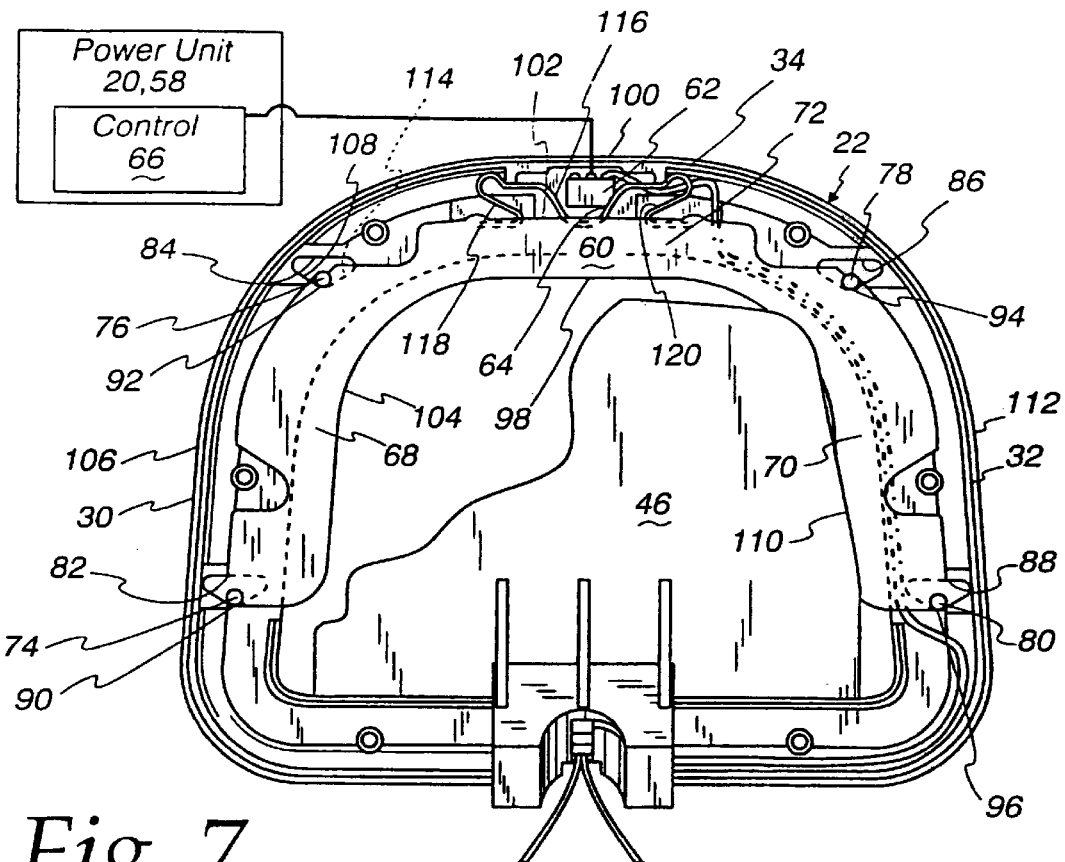
Fig. 6
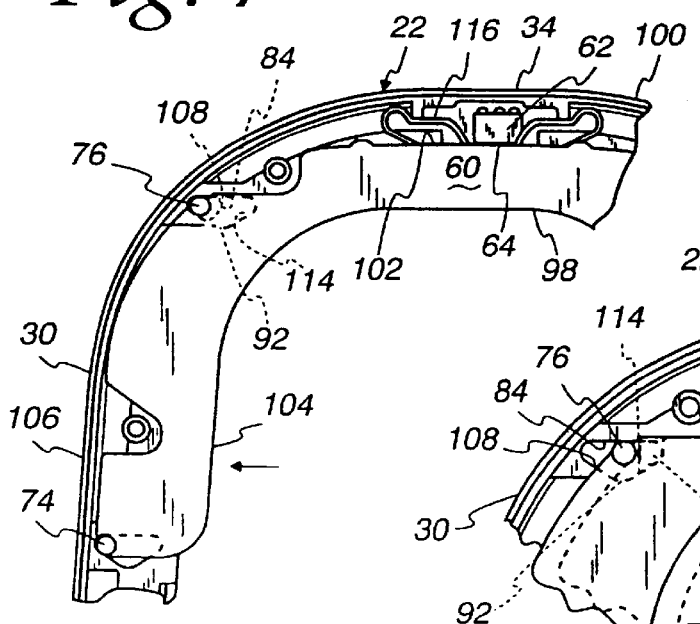
Fig. 7
Fig. 8

CONTROL FOR PORTABLE POWER TOOL

BACKGROUND OF THE INVENTION

1. Field of the Invention

This invention relates to portable power tools and, more particularly, to a control for operating a power source on the power tool.

2. Background Art

There are many hand-holdable power tools available on the market today. With those tools having dangerous working/operating elements, it is common to incorporate safety features which require that the user's hands both be strategically placed to avoid potentially injurious contact with the particular operating elements.

One such tool is a hedge trimmer of the type utilizing a cantilevered, forwardly projecting cutting assembly. An exemplary cutting assembly uses reciprocating blades which are configured and synchronized to produce a scissors action that severs vegetation. In one form, a gas operated power source drives the cutting assembly. A rear handle is provided on the power unit to support the rear of the tool. A forward handle is provided nearer the cutting assembly. By gripping both handles, the user can maintain the tool in a balanced cutting position.

It is also known to use a U-shaped forward handle, commonly called a "D-handle", on the tool. This allows the user to grip at least three different regions which facilitate left- and right-hand vertical trimming and horizontal trimming.

Because of the close proximity of the forward handle to the cutting assembly, it is known to incorporate a safety power cutoff switch. In one form, this safety switch is controlled by an actuator bar that is pivotable between an "on" position and a "disable" position. The bar is normally biased to the disable position. By drawing the bar towards the forward handle, the operator can reposition the bar to the on position and maintain the bar in that position by a natural gripping action on the handle which squeezes the bar thereagainst. The user is thus required to grip the forward handle and bar with the forwardmost hand, thereby isolating this hand from the cutting assembly.

In some constructions, the bar is designed to be comfortably grasped with the handle only with the user grasping the handle for horizontal cutting. While it is possible to reposition the bar to the on position while using the left- and right-hand vertical grips, the user does not have the same leverage. Accordingly, the grip may be relatively uncomfortable and may ultimately cause user fatigue.

A more serious problem that this presents is that the user, in order to avoid this discomfort and/or fatigue, may defeat the safety feature by mechanically securing the bar to the handle so that it is always in the "on" position. The user's front hand is then unconstrained during operation and may be inadvertently brought into contact with the cutting assembly.

SUMMARY OF THE INVENTION

In one form of the invention, a portable tool is provided including a frame, a working element on the frame, and a power unit for operating the working element. A switch on the frame is changeable selectively between a) a first state and b) a second state, with the switch in the first state causing the power unit to be in a first state and in the second state causing the power unit to be in a second state. An actuator on the frame is selectively repositionable relative to the frame by movement in a first path to change the switch from its first state into its second state. The actuator is mounted for movement relative to the frame in a second path that is different than the first path to change the switch from its first state into its second state.

The working element on the portable tool may be a flexible line or cutting blade for severing vegetation. Other working elements are also contemplated.

In one form, the portable tool has a handle to facilitate holding by an operator. The handle has first and second transverse surfaces which can be engaged by an operator. The actuator has a first part that is movable toward the first handle surface to cause the actuator to move in the first path and a second part that is movable by an operator towards the second handle surface to cause the actuator to move in the second path.

In one form, the handle has first and second regions that can be at least partially surrounded by a user's hand to grip the handle. The first part of the actuator has a first gripping surface facing in a first direction. The first handle region has a gripping surface facing oppositely to the first direction. The operator moves the actuator by gripping the handle and exerting a squeezing force on the first gripping surface and the gripping surface on the first handle region to cause the actuator to move in the first path.

The second part of the actuator may have a second gripping surface facing in a second direction, with the second handle region having a gripping surface facing oppositely to the second direction. The operator moves the actuator by gripping the handle and exerting a squeezing force on the second gripping surface and the gripping surface on the second handle region to cause the actuator to move in the second path.

The handle may be defined by a formed tube that bounds an opening through which a part of an operator's hand can be extended to grip the handle.

In one form, the handle has a U-shaped portion with graspable first and second legs and a base, with the actuator having a first part that is operable by the hand of an operator grasping one of the first leg, the second leg, and the base to move the actuator in the first path to change the switch from its first state into its second state. The actuator has a second part that is operable by the hand of an operator grasping another of the first leg, the second leg, and the base to move the actuator in the second path to change the switch from its first state into its second state.

Cooperating cam surfaces can be provided on the handle and actuator to cause the actuator to move in a first path as the actuator is repositioned relative to the frame.

In one form, the actuator has a first surface that is engageable by an operator while grasping the handle and repositionable to cause the cam surfaces to cooperate so as to cause the actuator to move in the first path.

In one form, there is a post on one of the handle and actuator and a slot bounded by a surface on the other of the handle and actuator, with the post and slot surface being cammed against each other as the actuator moves in the first path.

In one form, the actuator is mounted for movement relative to the frame in a third path to change the switch from its first state into its second state.

In one form, the actuator is substantially U-shaped with first and second legs and a base, with the first leg of the actuator extending along the first leg of the handle, the second leg of the actuator extending along the second leg of the handle, and the base of the actuator extending along the base of the handle.

At least one spring element may be provided acting between the handle and actuator at first and second spaced locations to biasably maintain the actuator in a released position wherein the switch is in its first state.

The actuator may have a single piece that defines the first and second gripping surfaces.

In another form of the invention, a portable tool is provided having a frame, a working element on the frame, and a switch on the frame that is changeable selectively between a) a first state and b) a second state. The switch in the first state causes a power unit for operating the working element to be in a first state and in the second state causes a power unit for operating the working element to be in a second state. An actuator on the frame is repositionable relative to the frame to selectively change the switch from its first state into its second state. The actuator has first and second spaced surfaces. The first actuator surface is repositionable relative to the frame by an operator to thereby cause the actuator to move so as to change the switch from its first state into its second state. The second actuator surface is repositionable relative to the frame by an operator to thereby cause the actuator to change the switch from its first state into its second state.

A handle may be provided, as previously discussed, with the handle having a U-shaped portion with graspable first and second legs and a base. The first actuator surface is engageable and repositionable by a squeezing action produced by an operator's hand grasping one of the first leg, the second leg, and the base of the handle. The second actuator surface is engageable and repositionable to cause the actuator to change the switch from its first state into its second state by a squeezing action produced by an operator's hand grasping another of the first leg, the second leg, and the base of the handle.

With the actuator in its released position, exertion of a force on the first actuator surface causes the actuator to move relative to the frame in a first path to cause the switch to change from its first state into its second state. By exerting a force on the second actuator surface with the actuator in the released position, the actuator moves relative to the frame in a second path that is different than the first path to cause the switch to change from its first state into its second state.

The first and second surfaces may be transverse to each other.

In still another form of the invention, a portable tool is provided having a frame, a working element on the frame, a power unit for operating the working element and placeable selectively in first and second different operating states, and an actuator system that is operable selectively at each of first and second different locations on the portable tool to change the power unit from the first state into the second state.

BRIEF DESCRIPTION OF THE DRAWINGS

FIG. 6 is an enlarged, end elevation view of the handle and actuator in FIG. 5 with a rear portion of the handle removed and with the actuator in a released position;

FIG. 7 is an enlarged, fragmentary, cross-sectional view of the handle and actuator with the actuator moved from the released position in a first path to operate a switch on the power tools; and FIG. 8 is a view as in FIG. 7 showing the actuator moved from the released position in two different paths to effect operation of the switch.

DETAILED DESCRIPTION OF THE DRAWINGS

Figure 1:
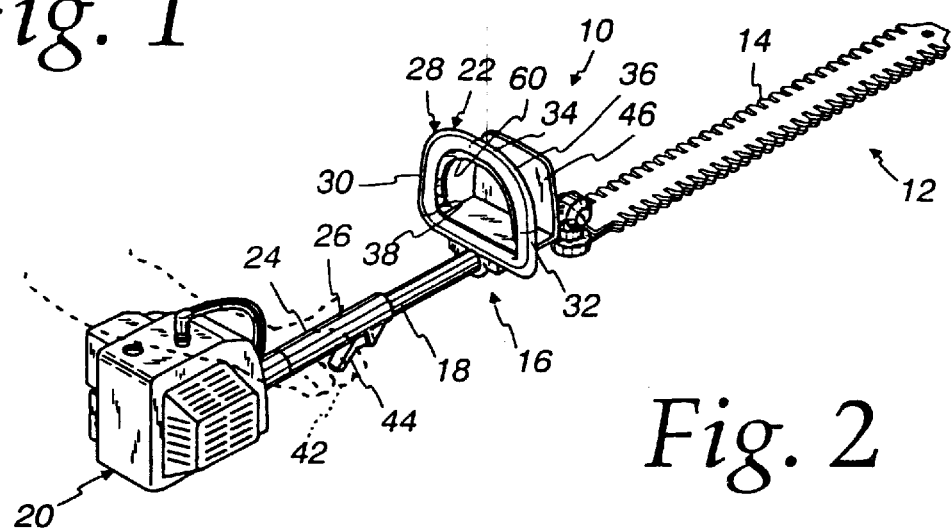
FIG. 1 is a perspective view of one form of portable power tool having a handle with an actuator, according to the present invention, for a control for a power unit on the tool.
Figure 2:
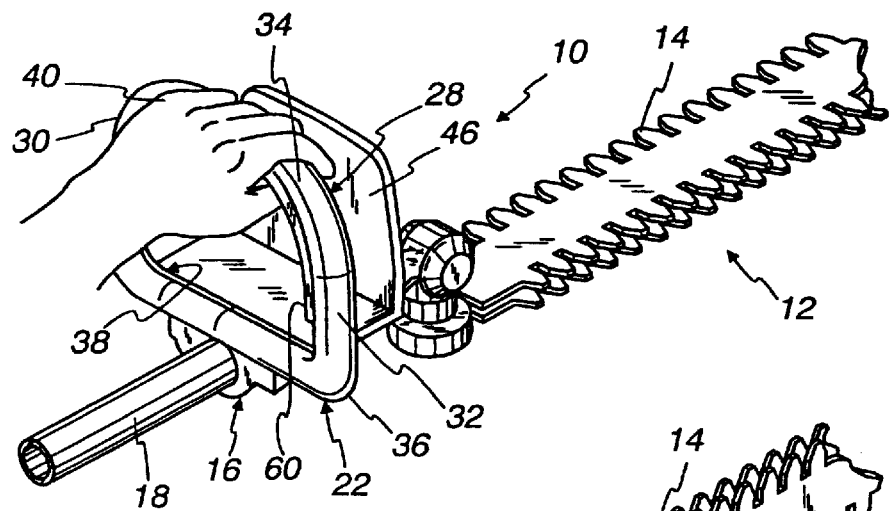
FIG. 2 is an enlarged, fragmentary, perspective view of the tool in FIG. 1 and showing the tool being grasped for horizontal operation.
Figure 3:
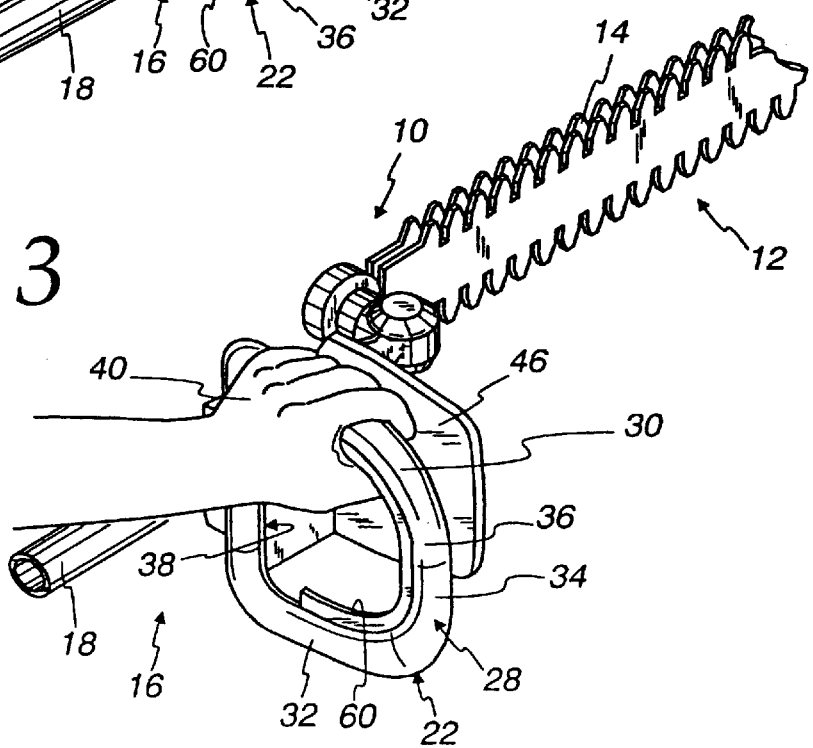
FIG. 3 is a view as in FIG. 2 and showing the tool being grasped for vertical operation.

In FIGS. 1–3, one form of portable tool, into which the present invention is incorporated, is shown at 10. The particular tool 10 is a hedge trimmer that has a working element/cutting assembly at 12 with metal blades 14 that mesh with each other to produce a scissors action that cuts vegetation.

The cutting assembly 12 is supported on the distal end of a frame 16 that is defined in part by an elongate, tubular element 18. The proximal end of the frame 16 supports a power unit 20, which may be gas or electrically operated. In this case, the power unit 20 is gas operated to drive the cutting assembly 12.

The tool 10 is supported in operation through front and rear handles 22, 24, respectively. The rear handle 24 is essentially a cylindrical, cushion grip 26 which surrounds the tubular element 18. The front handle 22, commonly referred to as a "D handle" is graspable in different manners to facilitate different cutting operations, as described below.

More particularly, the front handle 22 has a U-shaped portion 28 with graspable first and second legs 30, 32 and a graspable base 34 joining the legs 30, 32. The U-shaped portion and remaining portion of the handle 22 may be defined by a formed tube 36 that bounds an opening 38 through which an operator's hand 40 can be extended to grip the handle 22.

When it is desired to perform a horizontal cutting operation, the base 34 of the handle 22 is grasped by the one hand 40, as shown in FIG. 2. The operator's other hand 42 grasps the rear handle 24 in such a manner that a throttle trigger 44 is accessible, as with the index finger.

To perform a vertical and right-hand cutting operation, the user pivots the tool 10 and grasps the first leg 30 of the handle 22 with the hand 40 and situates the other hand 42 as shown in FIG. 1. Left-handed operation is facilitated by grasping the other handle leg 32 with the hand 40 in similar fashion.

A shield 46 is mounted on the frame 16 to prevent direct exposure between the user's hand 40 grasping the handle 22 and the cutting assembly 12.

Figure 4:
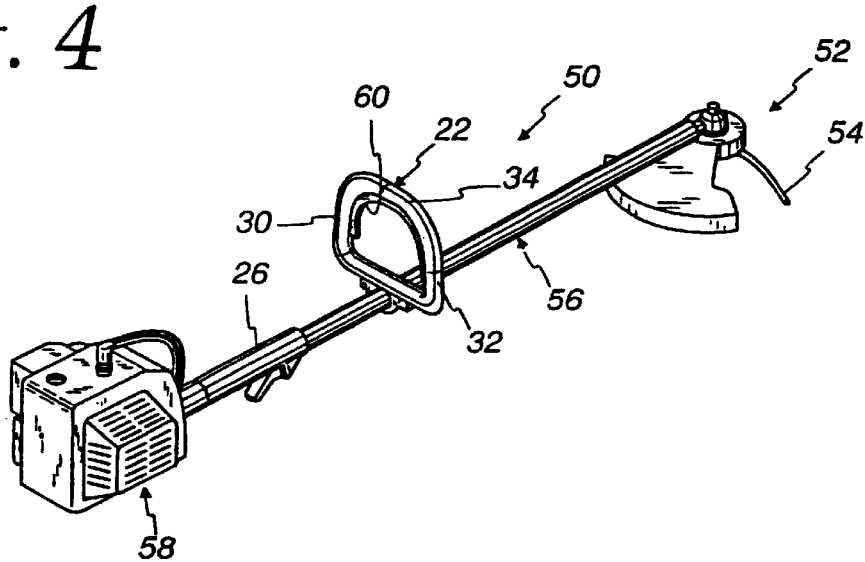
FIG. 4 is a perspective view of another form of portable tool with a handle mounted actuator, according to the present invention, incorporated therein.
Figure 5:
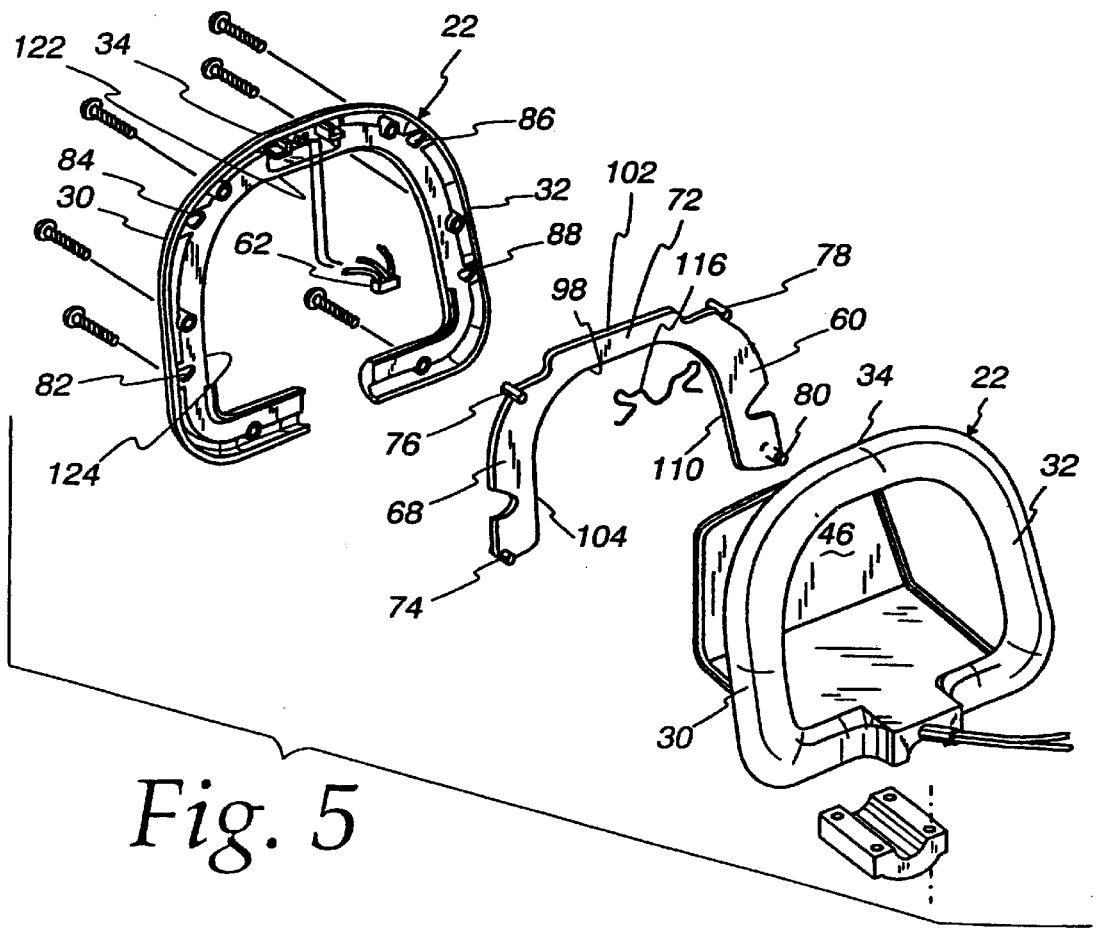
FIG. 5 is an enlarged, exploded, perspective view of the inventive handle and actuator on the tools in FIGS. 1–3.

This same arrangement of handles can be used on many other tools. For example, a flexible line trimmer is shown at 50 in FIG. 4. The working element 52 in this case is a rotary line 54 at the distal end of an elongate frame 56. At the proximal end of the frame 56, a power unit 58 is mounted.

The operator supports the tool 50 in the same manner as the tool 10, previously described. That is, the operator grasps the grip 26 with one hand and with the other hand engages the handle 22. The handle 22 has the same construction so that the tool 50 is conveniently operable in at least the three different positions previously described.

The present invention facilitates safe operation of the tools 10, 50 in various different orientations. As seen in greater detail in FIGS. 5–8, the handle 22 is equipped with a U-shaped actuator 60 that operates a switch 62. The switch 62 has a pivotable leaf element 64 that is movable by the actuator 60 between a first position, shown in FIG. 6 wherein the switch 62 is in a first state, and a second position, shown in FIG. 7, wherein the switch 62 is in a second state. The switch 62 operates any suitable control 66 to change a particular state of the power unit 20, 58. In this case, the control 66 is part of a cutoff circuit.

With the switch 62 in the first state of FIG. 6, the control 66 prevents operation of the power unit 20, 58. That is, the unit cannot be started or run with the switch 62 in this state. In the second state of FIG. 7, the control 66 allows the power unit 20, 58 to be started and operated normally. This is a common safety feature which requires that the forward hand 40 of the user be grasping the handle 22 to effect operation, thereby preventing inadvertent passage of the operator's hand 40 to against the operating cutting assembly 12, while using the tools 10, 50.

The switch 62 is only exemplary of the many different types of switches that can be used with the present invention. For example, a pressurized hose can be used which is compressible at multiple different locations to thereby activate a switch. As another alternative, an intermediate element such as a cam can be interposed between the actuator 60 and the switch 62, or another type of switch.

The actuator 60 is made in one piece and follows the general contour of the handle 22. That is, the actuator 60 has a first leg 68 extending along the first leg 30 of the handle 22, a second leg 70 extending along the second leg 32 of the handle 22, and a base 72 extending along the base 34 of the handle 22.

To guide movement of the actuator 60 relative to the handle 22 and tool frame 16, 56, a first pair of posts 74, 76 are provided on one side of the actuator 60 with a second pair of posts 78, 80 provided on the other side of the actuator 60. Each of the posts 74, 76, 78, 80 moves guidingly within an inverted, triangular slot 82, 84, 86, 88 on the handle 22. With the actuator 60 in a normal, released position, as shown in FIG. 6, the posts 74, 76, 78, 80 seat at the bottom 90, 92, 94, 96 of their respective slot. Since the cooperation between each of the posts 74, 76, 78, 80 and the slots 82, 84, 86, 88 is the same, the focus herein will be on one exemplary slot 84.

With the actuator 60 in the released position, and the user grasping the base 34 of the handle 22 as shown in FIG. 2, the user can squeeze between the fingers and palm the downwardly facing gripping surface 98 on the actuator 60 and an upwardly facing gripping surface 100 on the base 34 of the handle 22. As this occurs, an actuating surface 102 on the actuator 60 forces the leaf element 64 of the switch 62 from the position of FIG. 6 into that of FIG. 7. The actuator 60 follows a substantially straight vertical path between the released position of FIG. 6 and the position shown at A in FIG. 8. As this occurs, the post 76 moves unobstructedly in the slot 84 from the FIG. 6 position to the solid line position in FIG. 8.

By gripping the handle 22 as shown in FIG. 3, the user squeezes a gripping surface 104 on the actuator 60 and an oppositely facing gripping surface 106 on the first leg 30 between the fingers and palm. As this occurs, the post 76 bears against an inclined surface 108 bounding the slot 84 and is thereby cammed upwardly into the FIG. 7 position. The other pins 74, 78, 80 produce a similar camming action within their respective slots 82, 86, 88 to cause a smooth shifting of the actuator 60 from the FIG. 6 position to the position in FIG. 7, where again the actuating surface 102 moves the leaf element 64 of the switch 62 from the first position of FIG. 6 into the second position of FIG. 7. With this arrangement, the actuator 60 moves in a path that is different from that previously described resulting from upward shifting of the actuator 60 by squeezing the surfaces 98, 100.

By squeezing oppositely facing gripping surfaces 110 on the actuator 60 and 112 on the second handle leg 32, the actuator 60 is caused to move in a third path to change the switch 62 from the first state into the second state. In this case, the post 76 is cammed against the slot surface 114 to the dotted line position shown in FIG. 8 and identified as B therein.

It should be noted that the inventive system can be designed to operate with less than the four cooperating pairs of posts 74, 76, 78, 80 and slots 82, 84, 86, 88 shown. For example, the invention will function with a single post 76 and slot 84 combination, and more preferably with at least the two cooperating posts 76, 78 and slots 84, 86 at the top of the handle 22.

If the actuation system were modified to incorporate a pressurized actuation hose, as discussed above, the camming structure could be eliminated.

A formed wire spring 116 has spaced legs 118, 120 which act between the base 34 of the handle 22 and the base 72 of the actuator 60 at two spaced locations to nominally bias the actuator 60 towards the released position of FIG. 6. The spring 116 has sufficient flexibility to maintain the actuator 60 normally in the released position while at the same time allowing the actuator 60 to be shifted in all three paths, as previously described, to change the state of the switch 62.

The invention contemplates that the basic concept could be employed on other handle configurations. For example, the concept can be used to actuate a switch at any spaced location on a handle or on any transverse surfaces, such as the surfaces 122, 124 on the handle 22, towards which the actuator gripping surfaces 104, 98 can be drawn. However, the invention is particularly desirable with a tool having the FIG. 1 configuration, which can be designed for good balance and potentially even one hand use. This overall design also facilitates safe operation, sound attenuation and exhaust control.

With the convenience afforded by this inventive structure, users thereof are not likely to try to defeat the safety feature on the tool. Still other variations of the tools 10, 50 are contemplated. For example, an actuation system can be provided that is operable from different locations on the tool 10, 50 to independently change the state of the power unit 20 in the same manner from each location.

The foregoing disclosure of specific embodiments is intended to be illustrative of the broad concepts comprehended by the invention.

We claim:

1. A portable tool comprising:
   a frame;
   a working element on the frame;
   a power unit for operating the working element;
   a looped handle having a plurality of inverted triangular guiding slots; and
   an actuator system to switch the power unit between a first state and a second state, said actuator system including an arched portion movably disposed in said looped handle and having a plurality of guiding posts which are engaged with and movable within said inverted triangular guiding slots of said looped handle.

2. The portable tool according to claim 1, wherein said arched portion is biased by a spring toward a released position.

3. The portable tool according to claim 1 further comprises a switch including a leaf element, wherein a position of the leaf element is moved by a surface of said arched portion.

* * * * *